United States Patent Office 3,539,359
Patented Nov. 10, 1970

3,539,359
PACKAGING OF FOODSTUFFS
William Murchison, Rainford, England, and Stewart E. Crow, Edinburgh, Scotland, assignors to Cerebos Foods Limited, Willesden, London, England, a British company
No Drawing. Filed Jan. 26, 1968, Ser. No. 700,689
Claims priority, application Great Britain, Jan. 30, 1967, 4,523/67
Int. Cl. B65b 25/22, 55/00
U.S. Cl. 99—171  4 Claims

ABSTRACT OF THE DISCLOSURE

This invention relates to the packaging of acid-preserved moist foodstuffs which are subject to bacterial deterioration. Acid-neutralising substances are provided in a form whereby they are not available to the foodstuffs during storage at ambient temperatures but can be made available during the heating of the packages containing the foodstuffs prior to serving.

BACKGROUND

It is known to package cooked meat- and vegetable-based foodstuffs such as curries, stews, and bolognese sauces, which are subject to bacterial deterioration, in sealed plastic bags which are intended for storage at ambient temperatures. The cooked foodstuff is made acid and is introduced into the bag whilst in a pasteurised condition, and preservation during storage is effected by the acidity of the foodstuff. Thus the pH of the foodstuff is generally adjusted for example with lactic acid so that it will not rise above about 4.5 during storage, and this has been found sufficient for adequate preservation.

The packaging of cooked foodstuffs in this way is a recent development which is of considerable importance. Meat and vegetable-based products such as curries, stews, bolognese sauces and the like can be marketed in packages in some cases together with separate packages of rice, spaghetti or other farinaceous products to provide composite meals, and when preparing the meals all that is necessary is to place the packages in boiling water to heat the food after which the packages may be opened and the meal served. In theory, the packaging method could have wide application in the presentation of moist cooked meat-, fish-, vegetable- and fruit-containing foodstuffs, but the disadvantage is that the acidity of the foodstuff which is essential to adequate preservation during storage at ambient temperatures is responsible for an unacceptable flavour in many foodstuffs. With for example curries and bolognese sauces it may be possible by careful selection of the flavouring ingredients to mask the acidic effect, although this is not always satisfactory. In the case of many other foodstuffs the masking of the acidic effect is impossible.

The present invention provides a means of overcoming the disadvantage of the acidic effect, and thereby makes the method of packaging described above available for the presentation of moist cooked meat-, fish-, vegetable- and fruit-containing foodstuffs in general including foodstuffs wherein it has hitherto been impossible to mask the acidic effect.

According to the present invention, there is provided a package containing a moist foodstuff which is subject to bacterial deterioration and which has an acid pH to effect preservation during storage, there being incorporated into the package a quantity of an acid-neutralising substance which is not available to the foodstuff during storage at ambient temperatures but which is releasable by heating the package prior to serving whereby the acid flavour of the foodstuff is reduced or removed.

Where the acid-neutralising substance is contained within the package containing the moist foodstuff subject to bacterial deterioration, it may conveniently be contained in capsules the walls of which soften and collapse during the heating of the package in boiling water. In this embodiment of the invention, at least one capsule is incorporated in each package, and during the heating of the package the acid-neutralising substance is released from the capsule and dispersed in the foodstuff. It will generally be preferable to incorporate a plurality of capsules in each package as this will assist in ensuring that the acid-neutralising substance is adequately dispersed throughout the package and that pockets of the foodstuff having an undesired acid flavour do not remain. When preparing the package, the foodstuff is generally pasteurized by heating for example at about 80° C. The foodstuff is then introduced into the bag or other container which is sealed whilst still at the pasteurising temperature. Where encapsulated acid-neutralising substance is used in accordance with the present invention, it is therefore generally necessary that the walls of the capsules should be capable of surviving the pasteurizing temperatures without softening or collapsing. The capsule walls should thus desirably soften at a temperature between 80 and 100° C. One suitable material for the capsule walls is gelatin which has been partly tanned with formladehyde. Alternatively a nontoxic polymeric substance such as polyvinyl alcohol may be used. In order to increase the range of substances which are available for use in the production of the capsule walls, it may be possible to pasteurise using temperatures below 80° C. with heating for a longer period of time.

As an alternative to capsules, film-coated tablets may be used. Thus tablet cores containing the acid-neutralising substance and coated with for example polyvinyl alcohol may be adapted to release the acid-neutralising substance as a result of rupture of the film coating upon heating, e.g., to between 80 and 100° C.

The acid-neutralising substance is conveniently incorporated into the capsules as a suspension or dispersion in an edible oil such as for example soya or coconut oil. Alternatively the acid-neutralising substance may be in solid form or in the form of a solution.

The acid-neutralising substance is in general provided by a nontoxic alkaline-reacting substance such as for example bicarbonates, carbonates, alkaline phosphates and dilute sodium hydroxide. Alkali metal, for example sodium and potassium, carbonates and bicarbonates are especially preferred. The quantity of acid-neutralising substance is preferably sufficient to raise the pH of the foodstuff to the normal level, i.e., from 6.0 to 6.5, but less acid-neutralising substance may possibly be sufficient where a slight acid flavour can be adequately masked or is possibly acceptable in the foodstuff.

The containers are preferably provided by bags of material appropriate for the packaging of foodstuffs which are capable of surviving the heat in boiling water prior to serving. Suitable materials are well-known in the art and have been useful for example in the packaging of the known curry and bolognese sauce products which are described above. One suitable material is a laminate of polyethylene to polyester to polyvinylidene chloride.

The packages in accordance with the present invention may contain any moist cooked foodstuff which is subject to bacterial deterioration and which can be preserved at acid pH. Such foodstuffs may for example contain meats, fish, vegetables and fruits and examples of foodstuffs which may with advantage be packaged in this way include cooked meat, vegetable or fish dishes, e.g., stews, curries and bolognese sauces, purees, sauces, dilute flavouring syrups, fruit fiillings and the like.

The following examples illustrate the invention:

EXAMPLE 1

A slurry of sodium bicarbonate and vegetable oil in a ratio of 2:1 is prepared and then encapsulated in gelatin. The gelatin capsules are then cross-linked by treatment with formaldehyde. Each capsule contains 0.5 g. of sodium bicarbonate. One such capsule is introduced at the point of fill and at a temperature of 82° C. into a laminated sachet which is filled with 100 g. of a beef curry mix. The initial pH of the mix is 4.2. After cooling and storage, the sealed sachet is immersed in boiling water for 15 minutes. Under these conditions the gelatin capsule is ruptured and its contents are released. Neutralisation of the pack contents takes place and the final pH of the product is 6.3.

EXAMPLE 2

A slurry of sodium bicarbonate and vegetable oil in a ratio of 2:1 is prepared and then encapsulated in gelatin. The gelatin of the capsules is then cross-linked by treatment with formaldehyde. One such capsule is introduced at the point of fill and at a temperature of 82° C. into a laminated sachet (in a laminate of polyethylene to aluminum foil to polyester) which is filled with 100 gms. of a beef curry mix containing:

| | Gms. |
|---|---|
| Water | 40.94 |
| Meat | 20.37 |
| Onions | 9.74 |
| Apples | 5.52 |
| Fat | 4.95 |
| Yeast extract | 4.01 |
| Sultanas | 3.70 |
| Curry powder | 3.70 |
| Starch | 1.54 |
| Oil | 1.39 |
| Tomatoes | 1.23 |
| Sugar | 1.23 |
| Butter | 0.93 |
| Lactic acid | 0.54 |
| Salt | 0.21 |

The initial pH of the mix is 4.2. After cooling and storage the sealed sachet is immersed in boiling water for 15 minutes along with 2 ozs. of rice which had been enclosed in a separate package packed together along with the sealed sachet. Under these conditions the gelatin capsule is ruptured and its contents are released. Neutralisation of the pack contents takes place, the amount of sodium bicarbonate in the capsule having been calculated to give a final pH of 5.2. The contents of the neutralised pack are then served with the drained cooked rice.

EXAMPLE 3

Tablet cores are made from sodium carbonate and these cores are film coated with polyvinyl alcohol. One such film coated tablet is introduced at the point of fill and at a temperature of 82° C. into a laminated sachet (as described in Example 2) which is filled with 100 gms. of bolognese sauce containing:

| | Gms. |
|---|---|
| Water | 50.32 |
| Meat | 13.96 |
| Tomatoes | 13.10 |
| Onions | 6.12 |
| Carrots | 5.24 |
| Starch | 2.90 |
| Wine | 2.90 |
| Oil | 1.51 |
| Sugar | 1.28 |
| Spice | 1.15 |
| Parsley | 0.93 |
| Caramel | 0.35 |
| Lactic acid | 0.24 |

The initial pH of the mix is 4.2. After cooling and storage the sealed sachet is immersed in boiling water for 15 minutes along with 2 ozs. of spaghetti which had been enclosed in a separate package packed together along with the sealed sachet. Under these conditions the film coating of the tablet is ruptured and the alkali is released. Neutralisation of the pack contents takes place, the amount of sodium carbonate in the tablet core having been calculated to give a final pH of 5.8. The contents of the neutralised pack are then served with the drained cooked spaghetti.

We claim:

1. A food package comprising a sealed container composed of material capable of surviving the heat in boiling water, in which a foodstuff may be heated; a moist foodstuff normally subject to bacterial deterioration incorporated within said container, the pH of said foodstuff having been adjusted to a value sufficiently low to effect preservation during storage at ambient temperatures but to give an objectionable acid flavour; and a quantity of an acid-neutralising substance also incorporated within said container, said substance being unavailable to said foodstuff during storage but releasable by heating said container and its contents prior to serving to reduce the acid flavour.

2. A package according to claim 1 wherein said acid-neutralising substance is contained in one or more capsules the walls of which soften and collapse upon heating prior to serving thereby releasing said acid-neutralising substance.

3. A package according to claim 1 wherein said acid-neutralising substance is contained in one or more film-coated tablets, the coating of said tablet or tablets rupturing upon heating prior to serving thereby releasing said acid-neutralising substance.

4. A foodstuff pack according to claim 1 wherein the quantity of said acid-neutralising substance is sufficient to raise the pH of said foodstuff to at least 6.0.

References Cited

UNITED STATES PATENTS

| 2,702,246 | 2/1955 | Kinsella | 99—81 |
| 3,317,433 | 5/1967 | Eichel. | |
| 3,331,692 | 7/1967 | White | 99—174 |
| 3,359,120 | 12/1967 | Meusel | 99—109 |

FRANK W. LUTTER, Primary Examiner

W. L. MENTLIK, Assistant Examiner